United States Patent [19]

Costanza et al.

[11] 4,077,859

[45] Mar. 7, 1978

[54] POLYUNSATURATED HALOGENATED MONOMERS FOR USE IN ULTRAVIOLET COATING SYSTEMS

[75] Inventors: John R. Costanza, North Plainfield; Anthony B. Conciatori; Nelson R. Lazear, both of Chatham, all of N.J.

[73] Assignee: Celanese Corporation, New York, N.Y.

[21] Appl. No.: 729,560

[22] Filed: Oct. 4, 1976

[51] Int. Cl.$^2$ .................... C08F 2/50; C08F 4/00
[52] U.S. Cl. .................... 204/159.23; 260/42.29; 260/42.49; 260/42.52; 260/42.53; 526/292; 526/295
[58] Field of Search ............ 204/159.23, 159.16; 526/295, 292

[56] References Cited

U.S. PATENT DOCUMENTS

| | | | |
|---|---|---|---|
| 3,632,527 | 1/1972 | Alpert et al. | 252/501 |
| 3,827,962 | 8/1974 | Ahmad | 204/212 |
| 3,907,656 | 9/1975 | de Souza | 204/159.16 |

*Primary Examiner*—Walter C. Danison

[57] ABSTRACT

An improved ultraviolet curable coating composition particularly useful with titanium dioxide pigmented systems is disclosed containing about 5 to about 85 percent, by weight, based on the total ultraviolet curable composition, of an alpha beta ethylenically unsaturated vinyl polymerizable compound containing at least about 2 sites of alpha beta ethylenic unsaturation, up to about 50 percent, by weight, of an alpha beta ethylenically unsaturated vinyl polymerizable compound containing a single site of alpha beta ethylenic unsaturation, about 0.05 to about 15 percent, by weight, on the same basis, of an ultraviolet photoinitiator, and about 5 to about 50 percent, by weight, of a polyacrylate or methacrylate ester of a polyhalogenated polyol.

8 Claims, No Drawings

POLYUNSATURATED HALOGENATED MONOMERS FOR USE IN ULTRAVIOLET COATING SYSTEMS

BACKGROUND OF INVENTION

This invention relates to ultraviolet curable coating compositions. More particularly, this invention relates to ultraviolet curable coating compositions having improved cure properties when used in conjunction with titanium dioxide-based pigments.

The problems concerned with using titanium dioxide pigments in ultraviolet-type applications have been recognized. See. U.S. Pat. No. 3,632,527.

U.S. Pat. No. 3,827,962 discloses the use of certain titanium dioxide-based pigments in ultraviolet curable coating compositions. However, the use of the applicants' unique compounds is not disclosed.

The use of titanium dioxide pigments in ultraviolet curable coating systems has been difficult, due to the ultraviolet reflection characteristics of titanium dioxide. The coatings utilizing these pigments are difficult, if not impossible, to cure under standard ultraviolet conditions. Coating line speeds, as a result have been substantially decreased, while costs have increased. Furthermore, even those curable systems containing low amounts of rutile titanium dioxide have been difficult to cure uniformly and exhibit poor substrate adhesion and chemical resistance.

It is an object of this invention to prepare ultraviolet curable coating compositions into which may be incorporated titanium dioxide without an attendant loss of coating adhesion and chemical resistance properties.

It is another object of this invention to prepare titanium dioxide-containing ultraviolet curable coatings which will cure under conventional curing conditions.

It is still another object of this invention to prepare and utilize novel polyunsaturated materials in an ultraviolet curable coating composition. These and other objectives are obtained by preparing the compositions of the instant invention.

SUMMARY OF INVENTION

This invention involves the discovery that superior cure properties, i.e., hardness, adhesion and chemical resistance, and faster cure rates are obtained when the polyhalogenated polyol acrylates or methacrylates of the instant invention are employed. These compositions should be added to the ultraviolet coatings described herein in weights ranging from about 5 to about 50 percent of the total coating.

DESCRIPTION OF INVENTION

Basically, this invention involves the use of certain polyacrylate and polymethacrylate esters of polyhalogenated polyols in ultraviolet curable coating compositions. The term "polyacrylate or polymethacrylate" means a molecule containing more than one acrylate or methacrylate group per molecule. The term "polyhalogenated" means a material containing more than one chlorine, bromine, or iodine group per molecule. The materials useful in the instant invention should contain no other groups interferingly reactive with the ultraviolet curing mechanism.

Examples of the polyhalogenated polyols which may be used herein include the polyhalogenated materials derived from glycerine, trimethylolpropane, trimethylolethane, manitol, sorbitol, and the various glycols and polyether glycols, such as neopentyl glycol, ethylene glycol, propylene glycol, the various polyethylene and polypropylene glycols, etc.

The term "polyol" as used herein also includes polyphenol compounds, particularly those having the general formula as set forth in I below, as well as those materials derived from polyhalogenated polyepoxides, such as, for example, polybrominated bisphenol as further represented by the general formula in II below, or the polyalkylene polyphenolic derivatives as set out in III below.

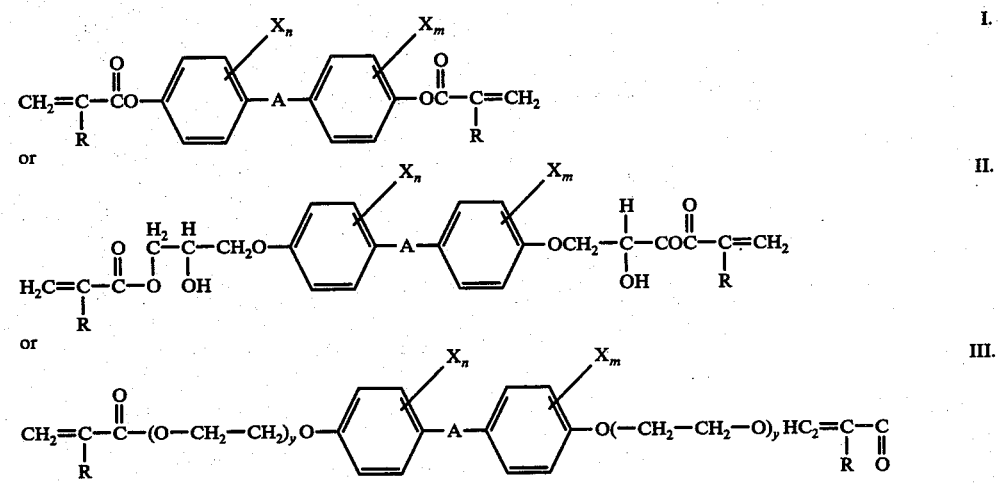

wherein R is hydrogen or methyl, X is chlorine, bromine, iodine or mixtures thereof, A is

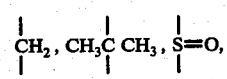

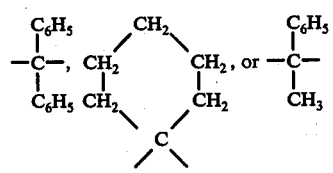

$m$ is 0 to 4, and $n$ is 0 to 4, wherein $m + n = 2$ to 8, and $y$ is 1 to 20.

Examples of the materials in the above formulae include tetrabromo bisphenol A diacrylate, tetrabromo bisphenol A epoxy diacrylate, tetrachloro bibiphenyl ethoxy diacrylate, and the like. These materials may be prepared by directly esterifying acrylic or methacrylic acid with a corresponding phenol, utilizing an ion exchange sulfonic acid type catalyst, sulfuric acid or other esterification catalyst, or by carrying out a transesterification reaction between, for example, ethylacrylate and the corresponding polyphenol, using antimony oxide, stanates, titanates or some other transesterification catalysts.

The materials of the Formula II type may be prepared, for example, by reacting the corresponding polyphenol with epichlorohydrin, and then treating the resulting diepoxide with acrylic acid or methacrylic acid, as the case may be.

The materials of Formula III may be prepared, for example, by reacting the corresponding polyphenol with ethylene oxide and then reacting the resulting polyethoxylated phenol with acrylic or methacrylic acid.

Examples of other types of compositions falling within the instant invention include the corresponding acrylate and epoxy acrylate esters of polyhalogenated hydroquinones, resorcinols, and the like. Also included are the acrylates and methacrylates of polyhalogenated novolak resins prepared by reacting with an aldehyde, such as formaldehyde, a polyhalogenated monophenol to form a polyphenol, and then reacting the resulting product with acrylic acid, an acrylate ester, epihalohydrin or the like, following the reaction sequences as set out above.

Other materials useful herein are prepared by reacting the corresponding polyhalogenated phenol with an unsaturated acid such as maleic, crotonic, cinnamic, or itaconic acid, or their anhydride, acid esters, acid chlorides or acid bromides in a Friedel-Crafts type alkylation.

Halogenated polycresols, polyxylenols and other phenolic type structures may also be used to prepare structures I, II, or III.

The compositions described above should be added to the ultraviolet curable compositions as described hereafter in the weight ratio of about 5 to about 50 percent, by weight, based on the total curable composition.

The second component of the instant invention which should be added in amounts ranging from about 5 to about 85 percent, by weight, based on the total ultraviolet curable composition, is an alpha beta ethylenically unsaturated compound containing at least about two sites of alpha beta ethylenic unsaturation per molecule. Thus, included are unsaturated esters of polyols and particularly such esters of the alpha methylene carboxylic acids., e.g., ethylene glycol diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200-1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-beta-hydroxy-ethyl-beta-(methacrylamido)ethyl acrylate, and N,N-bis(beta-methacryloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

A particularly useful class of compounds are the di-, tri-, and tetra- acrylate and methacrylate esters of di-, tri-, and tetra- polyols.

In addition, the polyethylenic unsaturation can be present as a substituent attached to a preformed polymer resin, such as an alkyd, a polyester, a polyamide, a polyurethane or a vinyl homo- or copolymer, as well as acrylate or methacrylate materials prepared by co-reacting the acrylate or methacrylate with an epoxide, such as the di-acrylate ester of the diglycidyl ether of bisphenol A.

The ultraviolet curable compositions which are useful herein may contain up to about 50 percent, by weight, based on the total curable composition, of a compound containing a single polymerizable ethylenically unsaturated group. These compounds may be polymeric in nature or may be monomers which are aliphatic, aromatic, cycloaliphatic or any variant thereof. Among the monomers are included styrene, 4-methylstyrene, alphamethylstyrene, and the like; acrylic acid and its nitrile, amide and $C_1$-$C_{12}$ alkyl, aryl, or hydroxy alkyl derivatives, such as acrylonitrile, ethylacrylate, 2-ethylhexyl acrylate, butoxyethoxyethyl acrylate, hydroxyethyl acrylate, as well as others; the vinyl halides, such as vinyl chloride, vinylidene chloride, and the like; vinyl ketones, such as vinyl phenyl ketone, vinyl methyl ketone, alphachlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

The blends of the instant invention can also contain up to about 60 percent, by weight, based upon the total curable system, of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenolformaldehyde polymers, the natural and modified natural polymers, the heterocyclic polymers, and the like.

If desired, the photo-polymerizable compositions of the instant invention can also contain immiscible polymeric or non-polymeric organic or inorganic fillers or reinforcing agents, e.g., the organophilic silicas, bentonites, silica, powdered glass, colloidal carbon, as well as various other types of dyes and pigments, in varying amounts.

As previously set out, the instant invention finds particular utility where titanium dioxidebased pigments are utilized. Such systems have improved adhesion, cure rates and other cure response properties when compared to prior art compositions, compounded in a like fashion with titanium dioxide pigments.

The ultraviolet curable compositions of the instant invention contain photoinitiators such as benzoin derivatives, as disclosed in German Patent No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

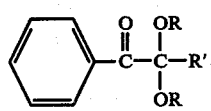
I.

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula

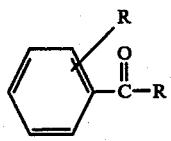
II.

the benzophenone type photosensitizers having the formula

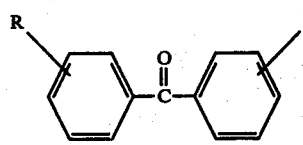
III.

the tricyclic fused ring type having the formula

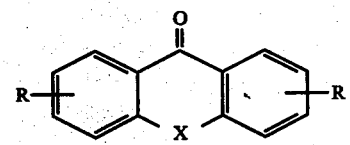
IV.

and the pyridyl type having the formula

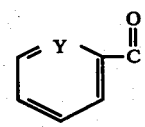
V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-napthoquinone, 9-10-phenanthrenequinone, 1,2-benzanthraquinone, 2-3-benzanthraquinone, 2-methyl-1,4-naphthoquinone, 2-3-dichloronaphthoquinone, 1,4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthraquinone and the like. Other photoinitiators which are also useful are described in U.S. Pat. No. 2,760,863 and include vicinal ketaldonyl compounds, such as diacetyl benzyl, etc., alpha ketaldonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alpha-allyl benzoin, and alpha phenyl benzoin. Also included are the diacylhalomethanes, corresponding to one of the general formulas:

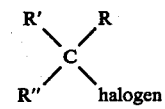

and

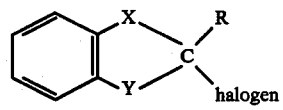

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in Industrie Cimique Belge, 24 (1959), 739–764. Most preferred among the added initiators are benzoin and its alkyl ethers, benzophenone and its derivatives, as in Formula III, xanthone, thioxanthones and chlorinated thioxanthones, acetophenone derivatives, as set out in formula I, and halogenated, aliphatic and aromatic polychlorinated biphenyls and polyphenyls.

The photosensitizers can be added in an amount of about 0.05 to about 15 percent, by weight, based upon the total curable system, preferably 0.1 to about 5 percent.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bismethylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyl-dimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methyl morpholine, N-2-hydroxyethylmorpholine, N-2-ethoxyethylmorpholine, piperazine, N-methylpiperazine, N,N"-dimethylpiperazine, 2,2-dimethyl-1,3-bis[3-(N-morpholinyl)-propionyloxy]propane, 1,5-bis[3-(N-morpholinyl)-prioionyloxy]diethyl ether, and the like. The preferred organic amines are the tertiary amines, with the alkanol amines being most preferred. The specific preferred amine activators are tri-ethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

Typically a mixture of the compositions described above, and where utilized, the amine activator, is prepared and the composition applied to the desired substrate. It is then exposed to electromagnetic radiation having wave lengths of above about 2000 Angstrom units, preferably from about 2000 up to about 5000 Angstroms. Exposure should be from a source located about 1 to 10 inches from the coating for a time sufficient to cause crosslinking of the composition and can range from about 0.1 seconds up to about 1 min./linear ft. Generally, the light radiation will have a power of about 1-600 watts per linear inch.

The light radiation can be ultraviolet light generated from low, medium and high pressure mercury lamps. This equipment is readily available and its use is well known to those skilled in the art of radiation chemistry.

In the following examples, all parts and percentages are by weight, unless otherwise indicated.

EXAMPLE 1

A blend was prepared comprising 20 parts tetrabromo bisphenol-A epoxy diacrylate, 30 parts trimethylolpropane triacrylate, 20 parts hexanediol diacrylate, 25 parts methyl methacrylate/ethylacrylate copolymer (50/50, by weight) (available from Rohm & Haas Company as Resin No. B-44, at 100 percent solids), 1.5 parts 2-chlorothioxanthone, and 3.5 parts triethanol amine. 30 parts of this blend were mixed with ten parts rutile titanium dixoide and ground in a steel ball mill for twelve hours. One mil films of the pigmented resin were cast onto Bonderite 1000 (Parker Division) steel panels and cured for 0.5 seconds under a 100 watt, medium pressure, Hanovia ultraviolet lamp. Hard, glossy, cured films with excellent adhesion to the substrate were obtained. A duplicate ultraviolet cured coating not containing the tetrabromo bisphenol A epoxy diacrylate produced incompletely cured coatings with poor surface characteristics. These latter coatings did not adhere well to the substrate. One to two seconds additional ultraviolet exposure were required to more completely cure the duplicate coatings. The coating containing the brominated monomer was also much more resistant to MEK solvent attack then the coating without the brominated compound.

EXAMPLE 2

A blend containing the following materials was prepared: 24.7 parts hexanediol diacrylate, 22.7 parts butyl acrylate, 11.5 parts of a low molecular weight polyester prepared by reacting 1 mole of adipic acid with 1 mole of phthalic anhydride and 2.2 moles of ethylene glycol utilizing a sulfonic acid ion exchange resin, 11.5 parts of a high molecular weight 1:1 methyl methacrylate:ethyl acrylate copolymer described in Example 1, 8 parts dibromo neopentyl glycol diacrylate, 1.9 parts benzophenone, 1.85 parts Michler's Ketone, 1.85 parts diethanol amine, and 16 parts rutile titanium dioxide. This mixture was ball milled for 12 hours. One mil films of this pigmented resin were cast on steel panels and cured as in Example 1. The coating containing the brominated monomer had superior properties over duplicate coatings not containing the brominated monomer.

EXAMPLE 3

A blend was prepared containing 17.4 parts bisphenol-A epoxy diacrylate, 17.4 parts trimethylolpropane triacrylate, 10.4 parts of the diacrylate ester of ethoxylated tetrabromo bisphenol-A diepoxide, 8.67 parts n-vinyl pyrrolidone, 2.6 parts dimethanol amine, 0.13 parts 2-chlorothioxanthone, and 43.4 parts rutile titanium dioxide. This mixture was ball milled for 12 hours. One mil films of this pigmented resin were cast on aluminum panels and were cured as in Example 1. The coating containing the brominated monomer had superior properties over duplicate coatings not containing the brominated material.

EXAMPLE 4

A blend was prepared containing 30 parts hexanediol diacrylate, 15 parts trimethylolpropane triacrylate, 15 parts polymeric tetrabromo bisphenol-A epoxy diacrylate having a weight per epoxide of 400, 7 parts pentaerythritol triacrylate, 1 part 2-chlorothioxanthone, 2 parts diethanol amine, and 30 parts rutile titanium dioxide. This mixture was ball milled for 12 hours. One mil films were cast on primed steel panels and were cured as in Example 1. The coating containing the brominated polymer had superior properties over a duplicate coating not containing the brominated polymer as in Example 1.

What is claimed is:

1. In an ultraviolet curable coating composition containing about 5 to about 85 percent, by weight, based upon the total composition, of an alpha beta ethylenically unsaturated vinyl polymerizable compound containing at least 2 sites of alpha beta ethylenic unsaturation, up to about 50 percent, on the same basis, of another alpha beta ethylenically unsaturated vinyl polymerizable monomer containing a single site of alpha beta ethylenic unsaturation, and about 0.05 to about 15 percent, by weight, of an ultraviolet photoinitiator, the improvement of which comprises utilizing as a reactive comonomer a polyacrylate or methacrylate ester of a polyhalogenated polyol.

2. The composition of claim 1 wherein the polyol is a mono- or polyphenyl polyphenol.

3. The composition of claim 1 wherein the polyacrylate or methacrylate is selected from the group consisting of:

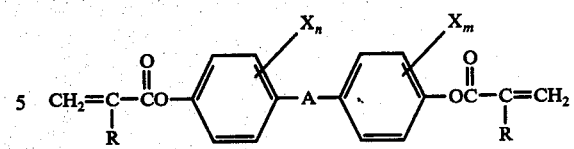

I.

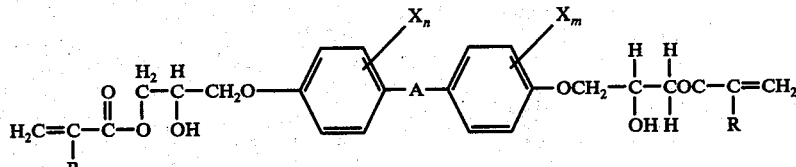

II.

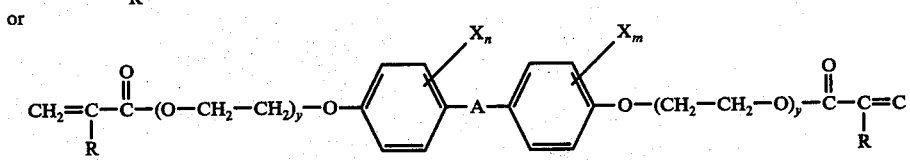

III.

wherein R is hydrogen or methyl, X is chlorine, bromine, iodine or mixtures thereof, A is

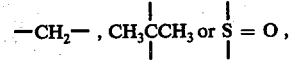

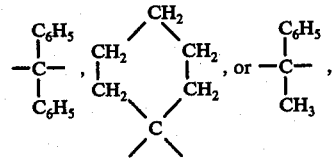

$m$ is 0 to 4, and $n$ is 0 to 4, wherein $m + n = 2$ to 8, and $y$ is 1 to 20.

4. The composition of claim 2 wherein R is hydrogen, $m$ is 2, $n$ is 2, and X is bromine.

5. The composition of claim 2 wherein R is hydrogen, $n$ is 2, $m$ is 2, and X is chlorine.

6. The composition of claim 2 in admixture with about 50 to about 500 percent, by weight, based on the total mixture, of an amine activator.

7. The composition of claim 2 in admixture with a titanium dioxide pigment.

8. The composition of claim 1 where the polyacrylate is prepared by reacting acrylic acid with tetrabromo bisphenol A.

* * * * *